United States Patent
Fujishima et al.

[11] Patent Number: 5,948,355
[45] Date of Patent: Sep. 7, 1999

[54] AIR-PURIFYING FILTER AND AIR-PURIFIER FOR AUTOMOBILE

[75] Inventors: Akira Fujishima, 710-5, Nakamaruko, Kawasaki, 211, Japan; Kazuhito Hashimoto, 2073-2-D213, Iijima-cho, Yokohama, 244, Japan; Shuzo Moroto, Aichi-ken, Japan; Masao Ando, Aichi-ken, Japan; Masako Sakai, Aichi-ken, Japan

[73] Assignees: Akira Fujishima, Kawasaki; Kazuhito Hashimoto, Yokohama; KabushikiKaisha Equos Research, Tokyo; Aisin Aw Co., Ltd., Anjo, both of Japan

[21] Appl. No.: 08/917,514

[22] Filed: Aug. 26, 1997

[30] Foreign Application Priority Data

Aug. 30, 1996 [JP] Japan .................................. 8-248887

[51] Int. Cl.$^6$ ........................................................ A61L 9/20
[52] U.S. Cl. .................................. 422/4; 422/5; 422/121; 422/122; 422/186.3; 422/24; 422/177; 55/385.3; 55/486; 55/524
[58] Field of Search ........................... 422/4, 5, 120, 422/121, 122, 186, 186.3, 22, 24, 177; 55/524, 486, 385.2

[56] References Cited

U.S. PATENT DOCUMENTS

| | | | |
|---|---|---|---|
| 4,264,421 | 4/1981 | Bard et al. | 204/157.51 |
| 5,492,678 | 2/1996 | Ota et al. | 422/186 |
| 5,650,126 | 7/1997 | Taoda et al. | 422/122 |
| 5,766,455 | 6/1998 | Berman et al. | 422/121 |

FOREIGN PATENT DOCUMENTS

1234729 9/1989 Japan .

*Primary Examiner*—Krisanne Thornton
*Assistant Examiner*—Fariborz Moazzam
*Attorney, Agent, or Firm*—Lorusso & Loud

[57] ABSTRACT

An air-purifying filter includes a carrier base and a $TiO_2$-Pd composite catalyst supported on the carrier base. CO in air treated by the filter is adsorbed onto the Pd surface and thus decomposed by oxidization to $CO_2$, whereas sulfur compounds in the air are adsorbed onto the Pd surface and then transferred to the $TiO_2$ surface where they are decomposed by oxidization to $SO_4^{-2}$ when the $TiO_2$ is subjected to irradiation. Preferably, Pd exists in a relatively small quantity at a first side of the carrier base in the vicinity of a light source and in a greater quantity at a second side opposite the first side. The first side is preferably located upstream relative to flow of air treated by the filter. An air-purifier utilizing this filter is mounted in an automobile, preferably on a rear shelf or in a trunk compartment. The air-purifier has a light source for irradiating the filter, and an exhaust port, arranged at a position to utilize negative pressure of the automobile generated during driving, to exhaust any substances desorbed from the composite catalyst to the outside of the automobile.

16 Claims, 6 Drawing Sheets

AIR-PURIFYING FILTER AND AIR-PURIFIER FOR AUTOMOBILE

BACKGROUND OF THE INVENTION

1. Field of the Invention

The present invention relates to an air-purifying filter for decomposing NOx, CO, sulfur compounds, cigarette odor and other hazardous components in the air, entering or generated in a passenger compartment of an automobile, for example. The present invention also relates to an air-purifier utilizing the air-purifying filter which is compact in size and suitable to be mounted in an automobile.

2. Description of the Prior Art

Various kinds of air-purifiers for an automobile have been proposed and practiced for purifying air containing dusts and contaminants. The prior art air-purifier includes a cartridge having an active carbon that adsorbs dust and contaminants in the air while the air passes therethrough under pressure.

In many of the prior art air-purifiers, a disposable type adsorbent such as an active carbon have been used in the cartridge. The adsorbent needs to be replaced at relatively short intervals, which is uneconomical. When the adsorbent is used for a longer period of time without timely exchange, it becomes incapable of purifying the air.

Another type air-purifier has been known in Japanese patent publication (JPA) No. 1-234729, which eliminates odor generated and existing in a compartment of an automobile, for example. This air purifier or deodorizer has an adsorbent supporting a photocatalyst that will decompose odor components adsorbed by the adsorbent when being subjected to irradiation. This deodorizer has a long-lived deodorization capability.

Gases entering or generated in an automobile passenger compartment include many kinds of poisonous, harmful or hazardous components such as NOx, CO, sulfur compounds and cigarette odor. Photocatalysts such as those proposed in the above-mentioned JPA No. 1-234729 have been proved to be effective to eliminate odor components and NOx. In the meantime, platinum group catalysts such as Pd have been known to effectively oxidize and eliminate CO. Thus, in order to eliminate NOx, CO and odor components in the air, in accordance with the prior art technology, it would be necessary to employ a composite air-purifier having a first filter supporting a photocatalyst mainly for oxidized decomposition of NOx and another filter supporting a platinum group catalyst effective in main to eliminate CO by its oxidized decomposition. Such a composite air-purifier would be large and difficult to mount in an automobile.

On the other hand, sulfur compounds such as SOx and $H_2S$ poison the platinum group catalysts. When the platinum group catalyst is continuously used for a long period of time in an atmosphere containing poisonous components including NOx, CO and sulfur compounds, it is gradually poisoned by the sulfur compounds and loses its catalyst activity. Therefore, the prior art air-purifying filter is not practically useful to be mounted in an automobile where the entering or existing gas contains mixed poisonous components including NOx, CO, sulfur compounds and cigarette odor.

SUMMARY OF THE INVENTION

Accordingly, an object of the present invention is to provide a novel construction of an air-purifying filter capable of eliminating drawbacks of the prior art and suitable for use in an automobile passenger compartment.

Another object of the present invention is to provide an air-purifying filter capable of effectively purifying a gas containing NOx, CO, sulfur compounds and cigarette odor.

Still another object of the present invention is to provide an air-purifying filter in which different kinds of catalysts are supported on a single support or carrier base, to provide a considerable size reduction in the filter.

Yet another object of the present invention is to prevent decrease of activity of a catalyst used in an air-purifying filter even when the filter is used in an atmosphere including sulfur compounds such as SOx and $H_2S$, without need for frequent exchange.

Yet another object of the present invention is to provide an air-purifying filter that can be used effectively and stably for a longer period of time.

Yet another object of the present invention is to provide an air-purifier utilizing the above-mentioned air cleaning filter, which is compact in size and suitable for use in an automobile passenger compartment.

According to an aspect of the present invention, there is provided an air-purifying filter comprising a carrier base and a composite catalyst supported on the carrier base and consisting of a photocatalyst and a platinum group catalyst supported on the photocatalyst. The composite catalyst becomes resistant to sulfur-poisoning when it is subjected to irradiation.

In a preferred embodiment of the present invention, the platinum group catalyst in the composite catalyst is present in a relatively small quantity at a first side of the carrier base in the vicinity of a light source and in a greater quantity at a second side of the carrier base opposite the first side. CO in air to be treated by the air-purifying filter is adsorbed onto the surface of the platinum group catalyst and thus decomposed by oxidization to $CO_2$. On the other hand, sulfur compounds in the air are also adsorbed onto the surface of the platinum group catalyst and then transferred to the surface of the photocatalyst where they are decomposed by oxidization to $SO_4^{-2}$ when the photocatalyst is subjected to irradiation.

The amount of the platinum group catalyst in the composite catalyst may be increased stepwise or continuously in a direction away from the light source of irradiation. Preferably, the first side of the carrier base having a smaller quantity of the platinum group catalyst is located upstream relative to air passing through the filter and the second side having a larger quantity of the platinum group catalyst is located downstream relative to the air passing through the filter.

In particularly preferred embodiments, the platinum group catalyst is Pd, and the photocatalyst is $TiO_2$.

The filter may be shaped into a honeycomb, a pleated shape or a corrugation.

The filter of the present invention is particularly suitable for use in atmospheres including such hazardous components as nitrogen oxides, sulfur compounds, CO and odors.

In accordance with still another aspect of the present invention, there is provided an air-purifier to be mounted in an automobile comprising an air-purifying filter having a carrier base and a composite catalyst supported on the carrier base and consisting of a photocatalyst and a platinum group catalyst carried on the photocatalyst, a light source for irradiating the filter, and an exhaust port, arranged at a position on the automobile where a negative pressure is generated during driving, to exhaust any substances adsorbed to the composite catalyst to the outside of the automobile.

In accordance with still another aspect of the present invention, there is provided an air-purifier to be mounted in an automobile comprising an air-purifying filter having a carrier base and a composite catalyst supported on the carrier base and consisting of a photocatalyst and a platinum group catalyst carried on the photocatalyst, a light source for irradiating the filter, sensors arranged at an air inlet and at an air outlet of the filter for detecting one or more hazardous components contained in air entering the air inlet and exiting the air outlet, respectively, a regenerator for regenerating the filter when an air purifying capacity defined by comparison between the quantity of hazardous components detected by the sensors at the air outlet and at the air inlet is decreased to below a predetermined ratio, and an exhaust port, arranged at a position on the automobile where a negative pressure is generated during driving, to exhaust any substances desorbed from the composite catalyst to the outside of the automobile.

In a preferred embodiment of the air-purifier of the present invention, the platinum group catalyst is supported in a smaller quantity on the photocatalyst toward a side facing the light source. It is also preferable that the platinum group catalyst is supported on a smaller quantity in the photocatalyst at a first side of the filter facing the light source and in a larger quantity at a second side opposite to the first side. The first side of the filter is located upstream relative to air to be treated by the air-purifier and the second side is located downstream of the air.

The air-purifier is preferably mounted on a rear shelf of the automobile. In this case the air-purifier may also comprise one or more of holes in the rear shelf to provide communication between the exhaust port and the trunk compartment.

The air-purifier may be mounted in a trunk compartment of the automobile. In this case, it is preferable to provide an intake pipe for introducing air from the passenger compartment to the filter; an outlet pipe for supplying clean air to the passenger compartment after air purifying operation by the filter; and an exhaust pipe extending from the exhaust port for communication with the outside of the automobile.

In accordance with still another aspect of the present invention, there is provided an air-purifying method comprising the steps of locating a composite catalyst consisting of $TiO_2$ and Pd carried thereon in a flow path of an air stream containing CO and sulfur compounds; and irradiating the composite catalyst. CO in the air is adsorbed onto the Pd surface and thus decomposed by oxidization to $CO_2$, whereas the sulfur compounds in the air are also adsorbed onto the Pd surface and then transferred to the $TiO_2$ surface where they are decomposed by oxidization to $SO_4^{-2}$ when the composite catalyst is irradiated to activate the $TiO_2$.

In accordance with still another aspect of the present invention, there is provided an air-purifying method comprising the steps of locating a composite catalyst consisting of $TiO_2$ and Pd carried thereon in a flow path of an air stream containing CO and SOx and/or $H_2S$; and irradiating the composite catalyst. CO in the air is adsorbed onto the Pd surface and thus decomposed by oxidization to $CO_2$, whereas SOx and/or $H_2S$ in the air are also adsorbed onto the Pd surface and then transferred to the $TiO_2$ surface where they are decomposed by oxidization to $SO_4^{-2}$ when the composite catalyst is irradiated to activate the $TiO_2$.

In accordance with the present invention, the composite catalyst comprising the platinum group catalyst supported on the photocatalyst is used in the filter. Although a platinum group catalyst such as Pd, has been known as a typical CO oxidizing catalyst, effective when used alone, it is poisoned by sulfur compounds such as SOx and $H_2S$ contained in the air, thereby greatly reducing its catalytic activity. However, the inventors have made various tests and experiments and have found that, when Pd is carried on the photocatalyst such as $TiO_2$, and such $TiO_2$—Pd composite catalyst is subjected to light irradiation, the sulfur compounds such as SOx and $H_2S$ in the air are oxidized to $SO_4^{-2}$.

Since $SO_4^{-2}$ has a catalyst poisoning effect much weaker than SOx and $H_2S$, it is possible to maintain the CO oxidation activity of the platinum group catalyst for a longer period of time. Moreover, various hazardous polluting substances including NOx, SOx, $H_2S$ and odor components are decomposed and oxidized by $TiO_2$.

Figure 1:
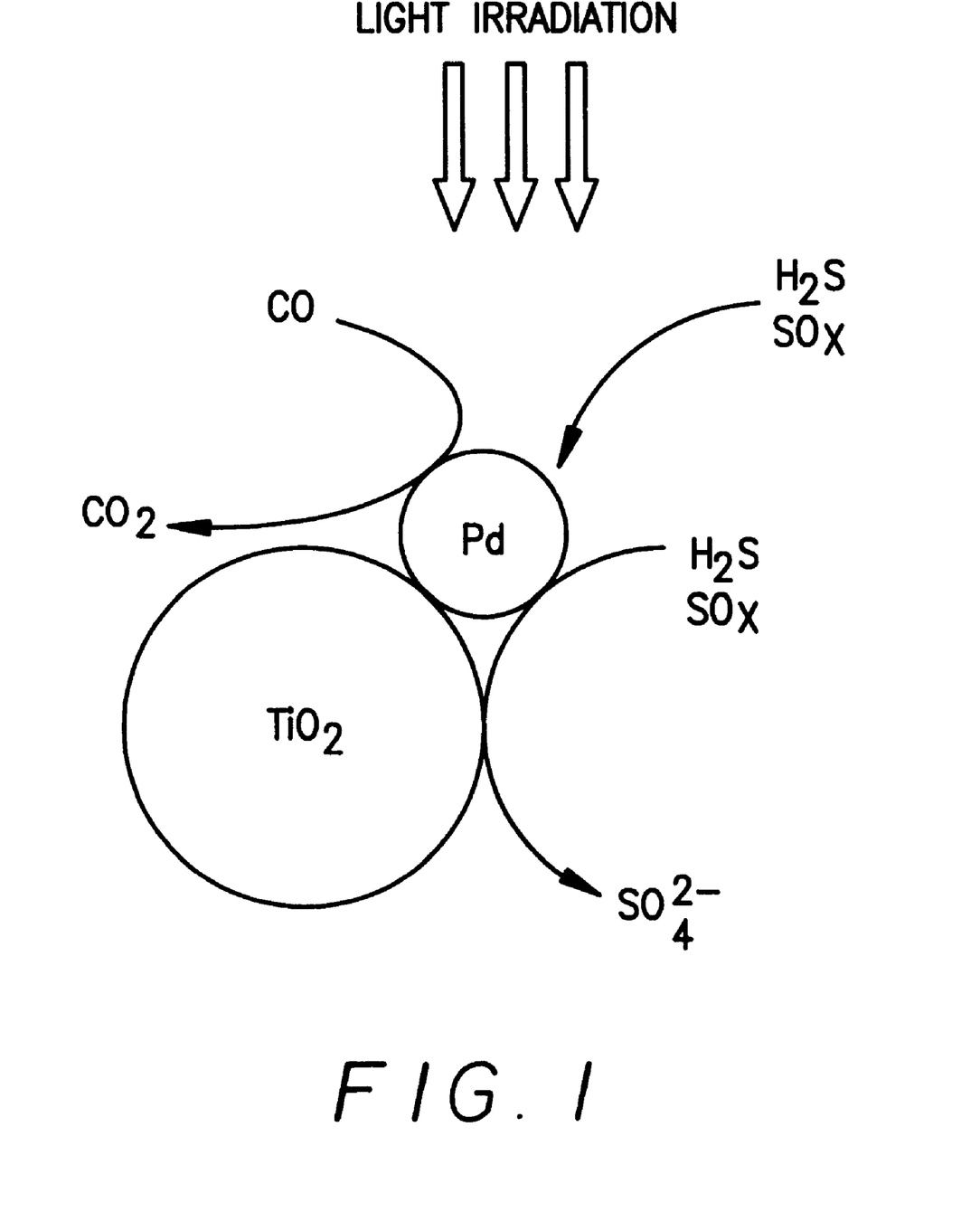
FIG. 1 is an explanation view showing a reaction model of a $TiO_2$—Pd composite catalyst.

The above-described reaction mechanism of the $TiO_2$—Pd composite catalyst that prevents Pd from being poisoned by SOx and $H_2S$ has not yet been fully clarified but can be assumed to be as illustrated in FIG. 1. More particularly, due to the great adsorptive capacity of Pd, SOx and $H_2S$ are first adsorbed onto the surface of Pd, but soon moved to the surface of the $TiO_2$. Then, SOx and $H_2S$ on the $TiO_2$ surface will be decomposed by oxidation to $SO_4^{-2}$ that has little catalyst poisoning effect when the composite catalyst is irradiated to activate the $TiO_2$. In other words, by irradiating a light beam onto the composite catalyst wherein Pd is supported on $TiO_2$, the oxidization function of $TiO_2$ is excited to oxidize the sulfur compounds that have been adsorbed by the Pd and then transferred to the $TiO_2$ surface. Accordingly, the CO oxidizing capacity of the Pd may be maintained without being affected by SOx and $H_2S$ contained in the air. Usually, the $TiO_2$ has a particle diameter of 6–200 nm which is substantially larger than the particle diameter of the Pd (usually 1–5 nm).

In the air-purifying filter of the present invention, the quantity of the platinum group catalyst is relatively small on the light source side, so that the oxidizing activity of the photocatalyst is higher on the light source side where the light quantity is abundant. Further, the platinum group catalyst is supported on the light source side of the filter in a quantity that is substantially minimal but sufficient to activate the photocatalyst ($TiO_2$). This is of course advantageous in view of cost savings in manufacturing the filter.

On the other hand, the quantity of the platinum group catalyst is relatively large and therefore will actively oxidize CO on the side opposite the light source side. Since the platinum group catalyst is carried on a photocatalyst such as $TiO_2$ that prevents the platinum group catalyst from being poisoned by sulfur compounds such as $H_2S$ and SOx contained in the air, the platinum group catalyst can provide stable catalysis for long duration.

The platinum group catalyst such as Pd should be present in the composite catalyst of the present invention in at least a predetermined quantity to provide a sufficient adsorptive function and CO oxidizing capacity. When the quantity of the photocatalyst such as $TiO_2$ in the composite catalyst of the present invention is insufficient, the surface area of the photocatalyst is reduced and its capacity for decomposing and oxidizing sulfur compounds such as $H_2S$ and SOx is decreased, in which case the platinum group catalyst would tend to be poisoned by the sulfur compounds remaining in the air. From these standpoints, it is preferable that the platinum group catalyst is contained in a quantity of 0.02 to 10% by weight, more preferably 0.1 to 2.0% by weight with respect to 100% by weight of the photocatalyst such as $TiO_2$. Much more preferably, the platinum group catalyst such as Pd is contained in a quantity of 0.3 to 1.0% by weight of the photocatalyst such as $TiO_2$.

Figure 3:
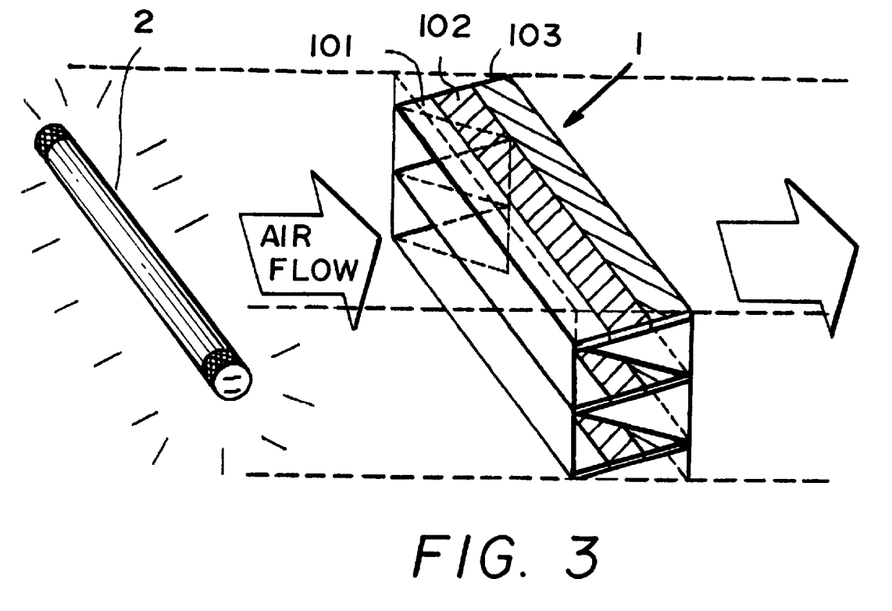
FIG. 3 is a schematic view showing an air-purifier for an automobile according to an embodiment of the present invention, wherein a pleated or folded air-purifying filter is combined with a light source.

FIG. 3 shows a pleated or folded air-purifying filter 1 embodying the present invention. In the filter 1 illustrated in FIG. 3, one surface carrying the composite catalyst is folded and divided into three pleats, and each pleat is divided into three strips 101, 102 and 103 aligned parallel to the light source 2. The quantity of the platinum group catalyst is smallest in the strip section 101, that is closest to the light source 2, and becomes larger further away from the light source 2. By way of non-limitative example, the platinum group catalyst may be carried in quantities of 0.02 to 0.1% by weight, 0.1 to 1.0% by weight and 1.0 to 2.0% by weight, with respect to 100 parts by weight of $TiO_2$, in the strip sections 101, 102 aud 103, respectively. The filter 1 cooperates with the light source 2 to form an air-purifier.

Figure 4:
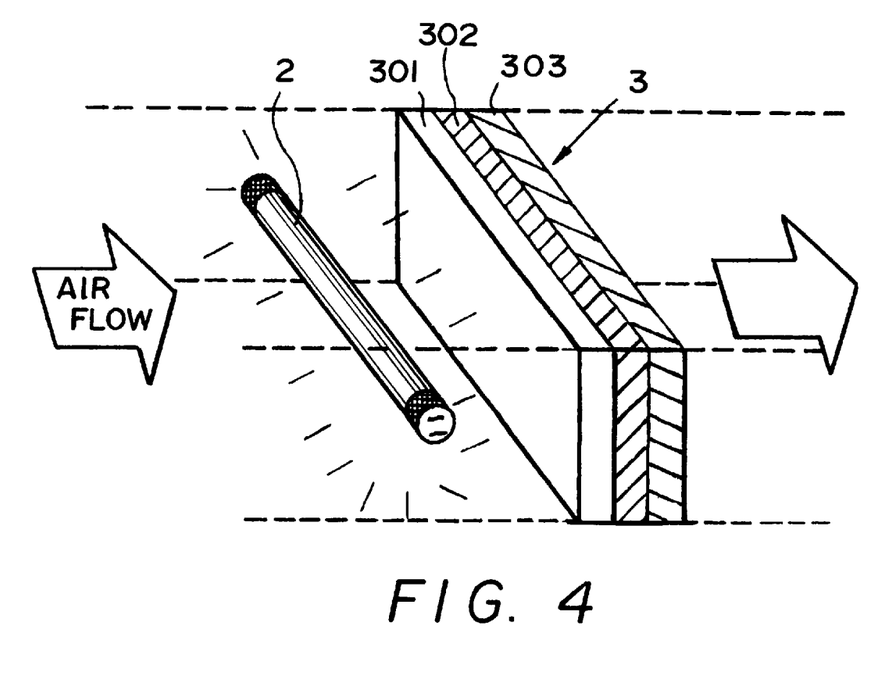
FIG. 4 is a schematic view showing an air-purifier for an automobile according to another embodiment of the present invention, wherein a layered or laminated air-purifying filter is combined with a light source.

FIG. 4 shows a layered or laminated air-purifying filter 3 embodying the present invention. In this embodiment, the filter 3 comprises three layers 301, 302 and 303 transverse to and spanning the air flow. The quantity of the platinum group catalyst is smallest in the first layer 301, that is closest to the light source 2, and becomes larger in the second layer 302 and is largest in the last layer 303. That is, the platinum group catalyst is carried on the filter in larger quantities further away from the light source 2. The filter 3 cooperates with the light source 2 to form an air-purifier.

When the air-purifying filter 1, 3 such as shown in FIG. 3 and FIG. 4 is irradiated by the light source 2 to activate photocatalysis by the photocatalyst such as $TiO_2$, the air to be purified is supplied preferably from the side of the light source 2 toward the filter. Illumination from the light source 2 is stronger at the strip section 101 or the first layer 301 arranged in close proximity to the light source 2, where oxidation and decomposition of odor components and NOx will proceed actively. Furthermore, due to oxidation catalysis by the photocatalyst ($TiO_2$), the platinum group catalyst (Pd) is prevented from being poisoned by sulfur compounds ($H_2S$ and SOx) in the air, as has been described with reference to FIG. 1. The photocatalysis reaction is well activated in the presence of the platinum group catalyst (Pd), though its quantity is relatively small in section 101 or layer 301.

On the other hand, at the strip section 103 or the last layer 303 positioned farther from the light source 2, the CO oxidization reaction (CO→$CO_2$) proceeds actively on the surface of the platinum group catalyst (Pd). Since the poisonous sulfur compounds ($H_2S$ and SOx) have been substantially oxidized to less poisonous $SO_4^{-2}$ by the photocatalyst ($TiO_2$) at the upstream sections 101 and 102 or layers 301 and 302, the air passing through the section 103 or layer 303 includes a relatively small quantity of non-oxidized, poisonous sulfur compounds ($H_2S$ and SOx), which would not be seriously harmful to the CO oxidation catalyzed by the platinum group catalyst (Pd).

The intermediate section 102 or layer 302 provides activities intermediate between those of the upstream sections 101 and 301 and the downstream sections 103 and 303. There may be provided a plurality of intermediate sections or layers in the air-purifying filter of the present invention.

BRIEF DESCRIPTION OF THE DRAWINGS

The foregoing and other objects and advantageous features of the present invention will become apparent from the following description when read in conjunction with the accompanying drawings in which.

DETAILED DESCRIPTION OF THE PREFERRED EMBODIMENTS

Composite Catalyst

A platinum group catalyst can be supported on $TiO_2$ by a known soaking method or electrodeposition method, for example. In order to homogeneously disperse a very small quantity of the platinum group catalyst on $TiO_2$, the photo-electrodeposition method is particularly preferred.

1. Soaking Method:

$TiO_2$ powder or a $TiO_2$ support (such as "ST-4" produced by Ishihara Sangyo Co., Ltd.) is soaked in an aqueous solution of $PdCl_2$ of an appropriate concentration over a predetermined period so that $PdCl_2$ is adsorbed by the $TiO_2$ powder or the $TiO_2$ support. $Pd(NO_3)_2$ or $Pd(NH_4)_4Cl_2$ can be used as a salt of Pd in place of $PdCl_2$. After the Pd salt is adsorbed by the $TiO_2$ powder or the $TiO_2$ support, the Pd salt on the $TiO_2$ is reduced to a Pd metal by a reducing agent, thereby obtaining a composite catalyst where Pd is supported on the $TiO_2$ surface. The Pd concentration in the obtained composite catalyst can be adjusted as desired. Examples of the reducing agent include formalin, formic acid, hydrazine, sodium borohydride and hydrogen.

2. Photoelectrodeposition Method:

To an aqueous solution of $PdCl_2$ containing an appropriate quantity of Pd is added 10% of ethanol and $TiO_2$ powder is then dispersed. By overnight irradiation with ultraviolet rays from a black light (2 to 3 $mW/cm^2$) of the resulting dispersion, Pd is precipitated on the $TiO_2$ surfaces. Then, the dispersion is subjected to centrifugation to obtain a composite catalyst having Pd supported on the $TiO_2$. The Pd concentration in the obtained composite catalyst can be adjusted as desired.

Platinum Group Catalyst

Examples of platinum group catalysts capable of oxidizing carbon monoxide (CO) to carbon dioxide ($CO_2$) include platinum (Pt), palladium (Pd), rhodium (Rh) and alloys and compounds thereof. The catalyst may be one selected from the group consisting of platinum chloride, dinitrodiamine platinum, platinum tetramine chloride, platinum sulfito composite salt, palladium nitrate, palladium chloride, palladium tetramine chloride, palladium sulfito composite salt, rhodium nitrate, rhodium chloride, hexaamine rhodium chloride, rhodium sulfito composite salt and rhodium sulfate. Pd has an excellent catalytic activity in CO oxidization at a temperature of 100° C. or below and, therefore, is particularly preferred as the CO oxidizing catalyst to be used in the air-purifying filter of the present invention.

Any catalyst activating substance may be added to the platinum group catalyst. Examples of such catalyst activating substances include metal compounds of at least one metal selected from the group consisting of chromium, manganese, iron, cobalt, nickel, copper, zinc, silver, tungsten, alkaline earth metals and rare earth elements. For example, an oxide, nitrate, halide, carboxylate, sulfite, sulfate or phosphate of such a metal may be used as the catalyst activating substance.

Photocatalyst

Although explanation has been given using $TiO_2$ as a typical photocatalyst, any kind of material can be used as a photocatalyst in the present invention as long as it is capable of oxidizing and decomposing odor components and nitrogen oxides. For example, a photocatalyst may be one selected from the group consisting of oxides of Ti, Cu, Zn, La, Mo, V, Sr, Ba, Ce, Sn, Fe, W, Mg and Al. The photocatalyst may be any precious metal. It is also possible to use a photocatalyst supported on an adsorbent such as active carbon, active carbon fiber or silica gel.

Air-Purifying Filter

An air-purifying filter of the present invention may have any shape, but preferably it has a large area in contact with the passing air and provides a small pressure loss. It has preferably a wide catalyst surface area and a good ultraviolet ray irradiation efficiency. Preferred shapes of the air-purifying filter of the present invention are a honeycomb shape, a pleated shape and a corrugated shape. The filter may also have a meshed structure.

A catalyst carrier of the filter may be a thin plate of a metal material having a good heat conductivity such as stainless, copper or aluminum. A molded (felt type, paper type, woven fabric type, etc.) product of active carbon fibers, active carbon powders or silica powders may also be used as the catalyst carrier of the filter.

A composite catalyst wherein a platinum group catalyst is carried on $TiO_2$ may be supported on the catalyst carrier. Alternatively, a composite catalyst is mixed with a molding material and the resulting mixture is molded into a predetermined shape for the catalyst carrier. It is also preferable to use a commercial air-purifying filter that already carries a photocatalyst (for example, a honeycomb-shaped deodorant filter "P-ST" series, by Ishihara Sangyo Co., Ltd., comprising corrugated sheets carrying thereon photocatalyst of titanium oxide and active carbon powders), on which a platinum group catalyst is additionally provided. A catalyst may be supported by mixing, addition, application, thermal spraying, soaking, electrodeposition or molding, at the time of molding the catalyst carrier or at a desired stage after molding.

When a thermal spraying method is employed in manufacturing an air-purifying filter that carries a platinum group catalyst in graduated or continuously different quantities in the direction of irradiation, a plurality of $Pd/TiO_2$ powder catalysts with different Pd concentrations (for example, two catalysts having Pd concentrations of 0.1% and 1.0%, or three catalysts having Pd concentrations of 0.1%, 0.5% and 1.0%, all percentages throughout the description being by weight) may be thermally sprayed onto different sections (101–103 in FIG. 3) of a pleated or honeycomb-shaped catalyst carrier. Alternatively, catalysts having different Pd concentrations are thermally sprayed or electrodeposited onto a plurality of catalyst carrier layers separately, and then the layers are laminated by welding in the order of Pd concentrations to produce an integral air-purifying filter.

Figure 5:
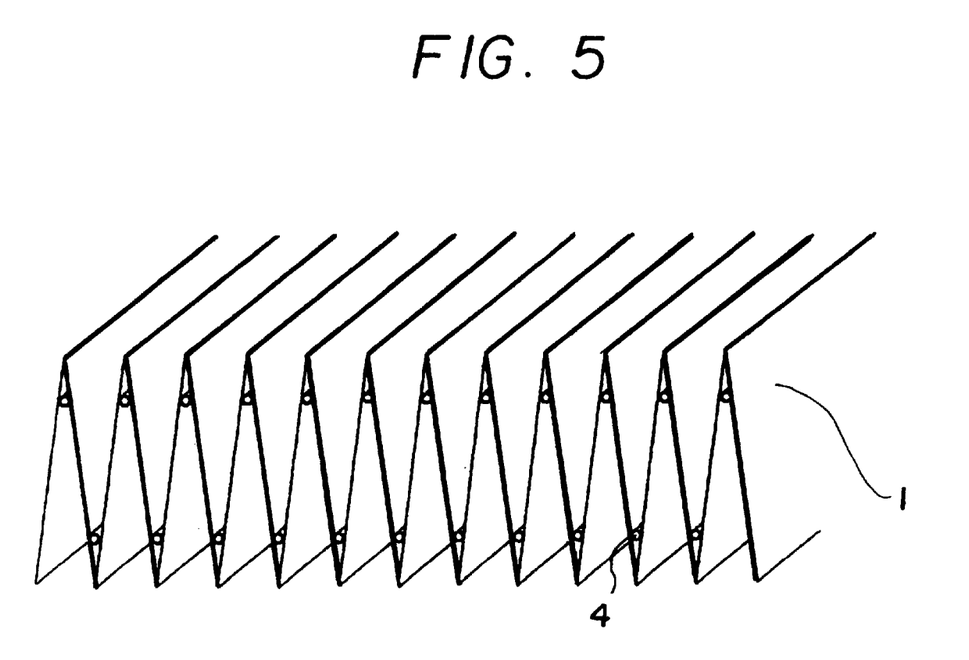
FIG. 5 is a schematic view showing a modification of the pleated air-purifying filter including heaters.

An air-purifying filter of the present invention can be regenerated by heating, with an adjustable light irradiation from an ultraviolet ray lamp onto the photocatalyst of the filter. Alternatively, the heat-regenerating means may comprise heaters 4 arranged within each apex of a pleated filter as shown in FIG. 5. A dielectric heating method, an electric resistance heating method or engine exhaust heat may also be used to regenerate the photocatalyst of the filter. A controller may be provided to control the output motor of an air blowing device (such as fan or blower) that introduces the air to be treated into the filter.

Air-Purifier for Automobile

Figure 6:
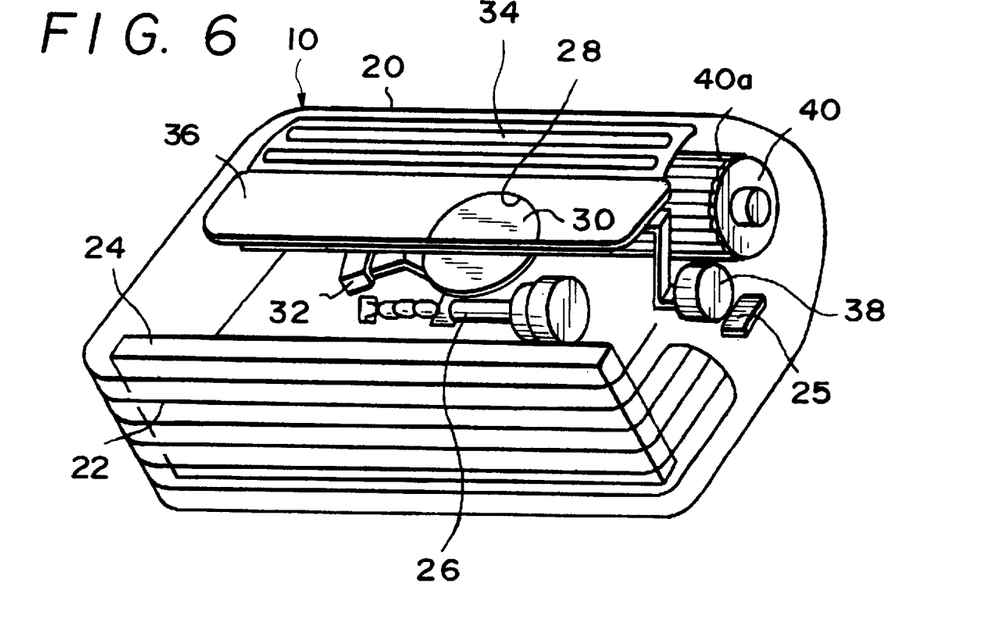
FIG. 6 is a view showing an embodiment of an air-purifier for an automobile in air purifying operation.
Figure 7:
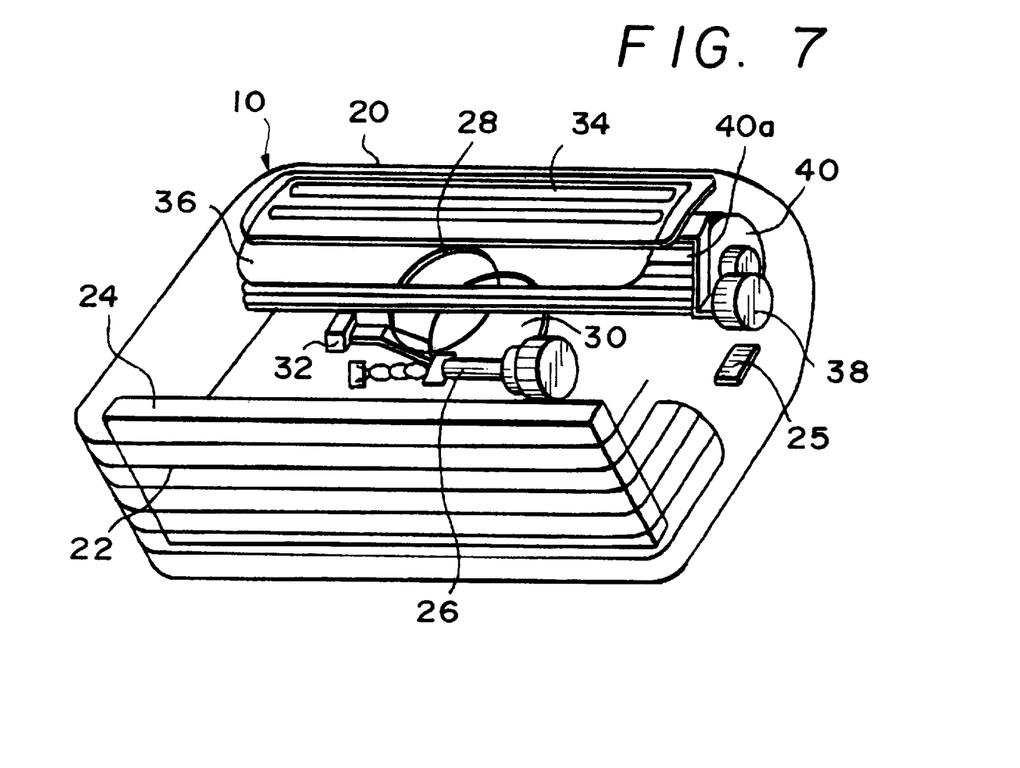
FIG. 7 is a view showing the air-purifier of FIG. 6 in filter regenerating operation.
Figure 8:
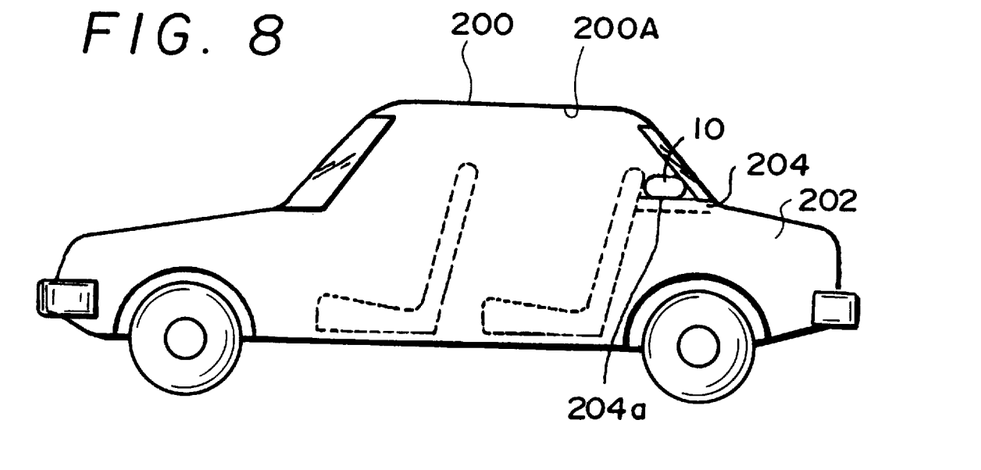
FIG. 8 is a schematic view showing an air-purifier of another embodiment that is mounted on the rear shelf of an automobile.

FIG. 6 and FIG. 7 show an embodiment of an air-purifier 10 for an automobile in accordance with the present invention. FIG. 6 shows the air-purifier 10 in air purifying operation, whereas FIG. 7 shows the same in filter regenerating operation. This air-purifier 10 may be mounted at any desired location in an automobile. In one preferred arrangement, as shown in FIG. 8, the air-purifier 10 is mounted on the rear shelf 204 that partitions the passenger compartment 200A and the trunk compartment 202 of the automobile 200. The trunk compartment 202 comprises a part of a ventilation system. The air inside the automobile 200 is exhausted to the outside by the negative pressure generated in the trunk compartment 202 while the automobile 200 is moving.

As shown in FIGS. 6 and 7, the air-purifier 10 includes an air inlet 22 formed at a front of a housing 20 for introducing the air from the passenger compartment 200A. An air-purifying filter 24 is arranged in the housing 20 in the vicinity of the air inlet 22 to purify the air introduced through the air inlet 22. The filter 24 has a composite catalyst of a photocatalyst and a platinum group catalyst supported thereon, has been described in detail. The air-purifier 10 also includes an ultraviolet ray lamp 26, an exhaust port 28 for exhausting the exhaust gas to the trunk compartment 202 (FIG. 8), a rubber lid or check valve 30 that is movable by a first actuating member 32 to open and close the exhaust port 28, an air outlet 34 arranged at an upper portion of the housing 20 in cooperation with a fan 40 to feed the cleaned air into the passenger compartment 200A, a shutter 36 that is rotatable by a second actuating member 38 to open and close the air outlet 34, and a controller 25 for controlling the first and second actuating members 32 and 38. Vanes 40a of the fan 40 may support photocatalysts. The fan 40 is driven by a motor (not shown).

During the air purifying operation of the air-purifier 10, as shown in FIG. 6, the controller 25 controls the first and second actuating members 32 and 38 such that the exhaust port 28 is closed by the lid 30 whereas the air outlet 34 remains open. Then, the fan 40 is driven to introduce the air into the passenger compartment 200A through the air inlet 22 into the housing 20. The introduced air is purified by the filter 24. The cleaned air is prevented from being exhausted toward the trunk compartment 202 and is allowed to pass through the opened air outlet 34 into the passenger compartment 200A.

On the other hand, during the filter regenerating operation of the air-purifier 10, as shown in FIG. 7, the controller 25 controls the first and second actuating members 32 and 38 such that the exhaust port 28 is opened to communicate the interior of the housing 20 with the trunk compartment 202 whereas the air outlet 34 is closed by the shutter 36 to prevent entry of the ambient air therethrough into the housing 20. Thus, a negative pressure is created in the housing 20, thereby separating and desorbing substances such as NOx and $SO_4^{-2}$ which have been adsorbed on the filter 24 during the air purifying operation of the air-purifier 10. The desorbed substances are discharged through the opened exhaust port 28 into the trunk compartment 202 and finally to the outside of the automobile 200. During the filter regenerating operation, a blower controller (not shown) controls the fan driving motor (not shown) so that the fan 40 is driven at a slower speed or brought to a standstill to thereby heat the filter 24, by irradiation of the lamp 26, to a temperature that is sufficient to regenerate the filter 24. Except during regeneration, in operation the fan driving motor is driven at an increased speed of rotation so that the air-purifier 10 is operated at a lower temperature.

The controller 25 may be omitted, in which case substance sensors capable of detecting one or more kinds of hazardous components such as odors, nitrogen oxides, sulfur compounds and CO are arranged in an air passage before and after the filter 24. Comparison between the pollution degrees of the air detected by the substance sensors reveals decline in the adsorption capacity of the filter 24, and when that capacity drops below a predetermined lower limit, the filter 24 is regenerated by slowing down or stopping the fan driving motor and thus increasing the filter temperature.

In the foregoing description the filter regenerating operation is conducted by raising the filter temperature by irradiation of the ultraviolet ray lamp 26. However, it is also possible to regenerate the filter 24 by dielectric heating, electric resistance heating, or engine exhaust heat. These heating methods may be employed alone or in combination with heating by irradiation of the ultraviolet ray lamp 26.

Gas generated during the filter regenerating operation is discharged to the outside of the automobile 200 or supplied to an engine (not shown) for combustion to prevent its entry into the passenger compartment 200A. In the embodiment of FIG. 8, the exhaust gas is discharged through the exhaust port 28, which is open during the filter regenerating operation, into the trunk compartment 202 and finally to the outside of the automobile 200. In this embodiment, the air purifier 10 can easily be installed by simply providing a hole or holes 204a in the rear shelf 204 for communicating the exhaust port 28 with the trunk compartment 202 which does not require an exhaust pipe to be connected to the exhaust port 28 for discharging the exhaust gas to the outside of the automobile 200. Moreover, in this embodiment, a negative pressure is created in the trunk compartment 202 while the automobile 200 is moving, which facilitates desorption efficiency and regeneration of the filter 24.

Figure 9:
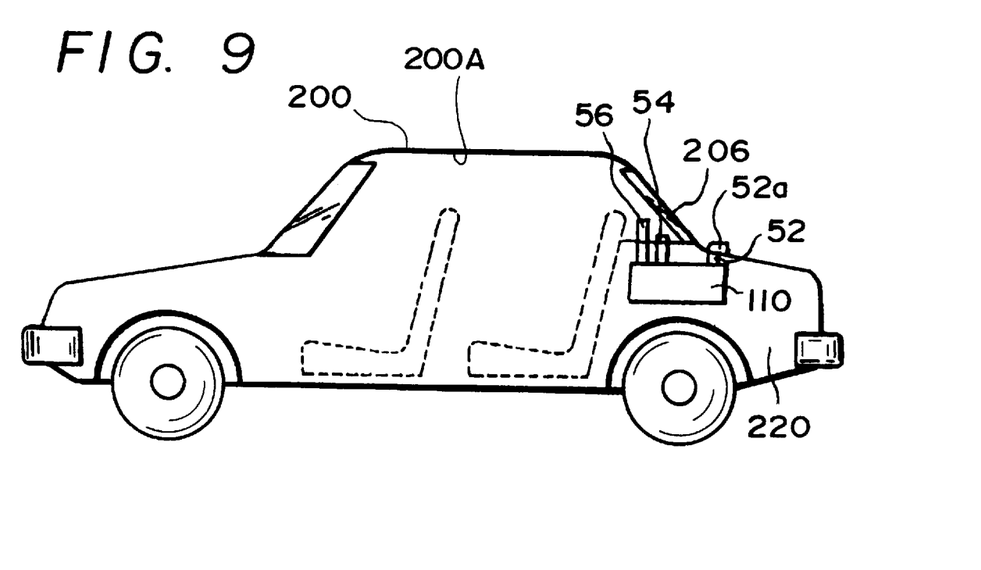
FIG. 9 is a schematic view showing an air-purifier of still another embodiment that is mounted in the trunk compartment of an automobile.

The air-purifier of the present invention may be mounted in the trunk compartment 202, as shown in FIG. 9. In this arrangement, an exhaust pipe 52 is connected to the exhaust port 28 of the air-purifier 110 for discharging the exhaust gas generated during the filter regenerating operation to the outside of the automobile. An intake pipe 56 for introducing the air and an outlet pipe 54 for returning the cleaned air are connected to the air-purifier 110 in communication with the passenger compartment 200A. The open end 52a of the exhaust pipe 52 is preferably arranged at the rear of a rear glass window 206 where a high negative pressure is generated during driving of the automobile 200.

EXPERIMENT

It was confirmed by the following experiment that the poisoning effect of sulfur compounds such as SOx and $H_2S$ is alleviated by a $TiO_2$—Pd composite catalyst.

A mixture of 20 ml of ethanol, 100 ml of $PdCl_2$ of 2.2 mM, 180 ml of $H_2O$ and 20 g of $TiO_2$ in a 1 liter beaker was stirred well under irradiation of a black light (2 to 3 $mW/cm^2$). A blackened portion at the side of the beaker was scratched out with a spatula every 2 to 3 hours, and the treatment was conducted over one night (for 13 to 16 hours). Then the solution was centrifuged at 3000 rpm for 20 minutes at room temperature. The operation of removing the supernatant, washing with water and centrifugation at 3000 rpm for 20 minutes at room temperature was repeated twice. The deposit was taken out and completely dried with a drier at about 120° C. for 1 to 2 hours to obtain a powdery $TiO_2$—Pd composite catalyst having 0.1% by weight of Pd supported by $TiO_2$. The resultant $TiO_2$—Pd composite catalyst was spread in a laboratory dish having a specimen area of $4.3^2\pi cm^2$, into which was added each 50 ppm of CO and $H_2S$ at predetermined intervals, with irradiation of ultraviolet rays of 1 $mW/cm^2$ and 3 $mW/cm^2$ and without irradiation.

Figure 2:
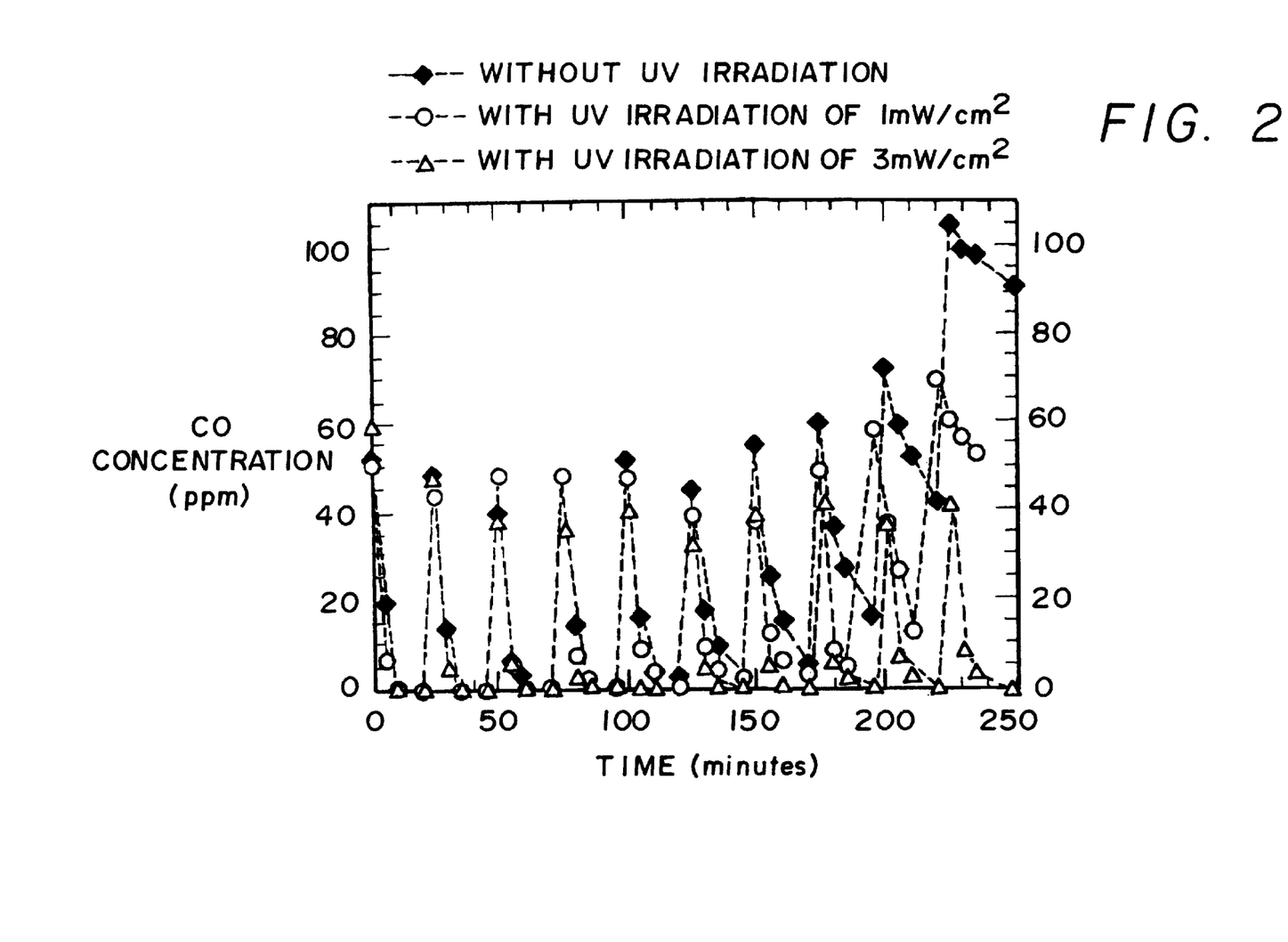
FIG. 2 is a graph showing the oxidization state of CO with respect to time passage where a mixture gas of CO and $H_2S$ is contacted with a $TiO_2$—Pd composite catalyst with and without ultraviolet ray irradiation.

Changes of oxidization state of CO with passage of time was measured with gas chromatography ("Ohkura GC 103") and the results are shown in FIG. 2. In FIG. 2, ★ marks indicate the results of experiments conducted without ultraviolet ray irradiation, ○ the results with ultraviolet ray irradiation of 1 $mW/cm^2$ and Δ the results with ultraviolet ray irradiation of 3 $mW/cm^2$. According to the results shown in the graph of FIG. 2, it is confirmed that the $TiO_2$—Pd composite catalyst provides stable and long-standing effect of eliminating CO by oxidation when its photocatalysis proceeds with ultraviolet ray irradiation of 3 $mW/cm^2$. However, when no ultraviolet ray irradiation is applied, and even when ultraviolet ray irradiation is applied but limited to 1 $mW/cm^2$, CO concentration increased with time. This would be because the catalytic activity of Pd was gradually poisoned by $H_2S$.

According to the present invention, since a platinum group catalyst is supported on the surface of a photocatalyst that is activated by light irradiation, the platinum group catalyst can be prevented from being poisoned by sulfur compounds in the air and therefore can provide an improved permanent effect of oxidizing and eliminating CO in the air.

Although the present invention has been described in connection with specific preferred embodiments thereof it is to be understood that the present invention is not limited to these embodiments and that various changes and modifications may be effected therein by one skilled in the art without departing from the spirit and scope of the invention as defined in the appended claims.

What is claimed is:

1. An air-purifying filter comprising a carrier base and a composite catalyst supported on said carrier base, said carrier base defining an airflow path through said filter and having first and second sides relative to the airflow path and said composite catalyst consisting of a photocatalyst and a platinum group catalyst supported on said photocatalyst, said platinum group catalyst in said composite catalyst existing in a relatively small quantity at the first side of said carrier base and in a greater quantity at the second side of said carrier base opposite to said first side, whereby CO in air treated by the air-purifying filter is adsorbed onto the surface of said platinum group catalyst and thus decomposed by oxidization to $CO_2$, whereas sulfur compounds in the air are also adsorbed onto the surface of said platinum group catalyst and then transferred to the surface of said photocatalyst where they are decomposed by oxidization to $SO_4^2$ when said photocatalyst is subjected to irradiation.

2. An air-purifying filter according to claim 1 wherein the quantity of said platinum group catalyst in said composite catalyst is increased stepwise from said first side toward said second side.

3. An air-purifying filter according to claim 1 wherein said first side of said carrier base having a smaller quantity of said platinum group catalyst is located upstream relative to the air flow path and said second side having a larger quantity of said platinum group catalyst is located downstream relative to the air flow path.

4. An air-purifying filter according to claim 1 wherein said platinum group catalyst is Pd.

5. An air-purifying filter according to claim 1 wherein said photocatalyst is $TiO_2$.

6. An air-purifying filter according to claim 1 shaped into a honeycomb, a pleated shape or a corrugation.

7. An air-purifying filter according to claim 1 wherein the quantity of said platinum group catalyst in said composite catalyst is increased continuously from said first side toward said second side.

8. An air-purifier comprising: an air-purifying filter comprising a carrier base and a composite catalyst supported on said carrier base and consisting of a photocatalyst and a platinum group catalyst supported on said photocatalyst; and a light source for irradiating said filter, said platinum group catalyst being carried in a smaller quantity on said photocatalyst toward a first side of said carrier base facing said light source relative to quantity of the platinum group catalyst supported on said photocatalyst at a second side of said carrier base, opposite said first side.

9. An air-purifier according to claim 8, wherein said carrier base defines an air flow path and wherein said first side of said filter is located upstream relative to the air flow path and said second side is located downstream relative to the air flow path.

10. An air-purifier mounted in an automobile for treatment of air from a passenger compartment comprising: an air-purifying filter having a carrier base and a composite catalyst supported on said carrier base and consisting of a photocatalyst and a platinum group catalyst supported on said photocatalyst; a light source for irradiating said filter; and an exhaust port, located at a positidn where a negative pressure is generated by the automobile during driving to exhaust any substances desorbed from said composite catalyst to the outside of the automobile.

11. An air-purifier according to claim 10 wherein said platinum group catalyst is supported in a smaller quantity on said photocatalyst at a side of said carrier base facing said light source, relative to quantity of the platinum group catalyst supported on said photocatalyst at a second side of said carrier base, opposite said first side.

12. An air-purifier according to claim 10 which is mounted on a rear shelf of the automobile, and which further comprises one or more holes in the rear shelf providing communication between said exhaust port and a trunk compartment.

13. An air-purifier mounted in an automobile for treatment of air from a passenger compartment comprising: an air-purifying filter having a carrier base and a composite catalyst supported on said carrier base and consisting of a photocatalyst and a platinum group catalyst supported on said photocatalyst; a light source for irradiating said filter; a regenerator for regenerating said filter when an air purifying capacity defined by comparison between the quantity of hazardous components detected by sensors at said air outlet and at said air inlet decreases to below a predetermined ratio; and an exhaust port, located at a position where a negative pressure is generated by the automobile during driving, to exhaust any substances desorbed from said composite catalyst to the outside of the automobile.

14. An air-purifier according to claim 13 which is mounted, in a trunk compartment of the automobile, and which further comprises an intake pipe for introducing air from the passenger compartment to said filter; an outlet pipe for returning the air to the passenger compartment after purification by said filter; and an exhaust pipe extending from said exhaust port for exhausting desorbed substances from the automobile.

15. An air-purifying method comprising the steps of locating a composite catalyst consisting of $TiO_2$ and Pd carried thereon in a flow path of an air containing CO and sulfur compounds said Pd existing in a relatively small quantity at a first side of said composite catalyst relative to the flow path of air and at a greater quantity at a second side of said catalyst opposite said first side; and irradiating said composite catalyst, CO in the air being adsorbed onto the Pd surface and thus decomposed by oxidization to $CO_2$, whereas the sulfur compounds in the air being also adsorbed onto the Pd surface and then transferred to the $TiO_2$ surface where the sulfur compounds are decomposed by oxidization to $SO_4^2$ when said composite catalyst is irradiated to activate $TiO_2$.

16. An air-purifying method comprising the steps of locating a composite catalyst consisting of $TiO_2$ and Pd carried thereon in a flow path of an air containing CO and SOx and/or $H_2S$ said Pd existing in a relatively small quantity at a first side of said composite catalyst relative to the flow path of air and at a greater quantity at a second side of said catalyst opposite said first side; and irradiating said composite catalyst, CO in the air being adsorbed onto the Pd surface and thus decomposed by oxidization to $CO_2$, whereas SOx and/or $H_2S$ in the air being also adsorbed onto the Pd surface and then transferred to the $TiO_2$ surface where the SOx and/or $H_2S$ are decomposed by oxidization to $SO_4^2$ when said composite catalyst is irradiated to activate $TiO_2$.

* * * * *

UNITED STATES PATENT AND TRADEMARK OFFICE
CERTIFICATE OF CORRECTION

PATENT NO. : 5,948,355　　　　　　　　　　　　　　　　　　　　　　　Page 1 of 1
DATED : September 7, 1999
INVENTOR(S) : Fujishima et al.

It is certified that error appears in the above-identified patent and that said Letters Patent is hereby corrected as shown below:

Column 3,
Line 59, "$CO_{2l, whereas}$" should read -- $CO_2$ whereas -- ;
Line 60, "$_{sox\ and/or\ H2s}$" should read -- sox, and /or $H_2S$ -- .

Column 10,
Line 19, the "★" should read -- ✦ -- .

Column 11,
Line 38, "positidn" should be omitted and replaced with -- position -- .

Signed and Sealed this

Fourth Day of September, 2001

Attest:

*Nicholas P. Godici*

NICHOLAS P. GODICI
*Attesting Officer*　　　*Acting Director of the United States Patent and Trademark Office*